United States Patent [19]

Kurata

[11] Patent Number: 4,551,750
[45] Date of Patent: Nov. 5, 1985

[54] COLOR PICTURE READING SYSTEM
[75] Inventor: Masami Kurata, Kanagawa, Japan
[73] Assignee: Fuji Xerox Co., Ltd., Tokyo, Japan
[21] Appl. No.: 413,199
[22] Filed: Aug. 30, 1982
[30] Foreign Application Priority Data
  Sep. 4, 1981 [JP] Japan .................. 56-138619
[51] Int. Cl.[4] ............ H04N 1/46; G03F 3/08
[52] U.S. Cl. ......................... 358/75; 358/80
[58] Field of Search ............ 358/75, 80, 282
[56] References Cited
  U.S. PATENT DOCUMENTS
  4,206,475  6/1980  Taudt et al. ................ 358/75
  4,479,242 10/1984  Kurata ................... 358/75 X Primary Examiner—John C. Martin
Assistant Examiner—Michael P. Dunnam
Attorney, Agent, or Firm—Sughrue, Mion, Zinn, Macpeak, and Seas

[57] ABSTRACT

A two-color reading system includes binary encoders for signals of wide and narrow wavelength ranges. The reference level of the narrow wavelength encoder is set proportionately to the level of the wide wavelength signal by means of a voltage divider, so that the second color of the two color system may be more accurately separated.

6 Claims, 12 Drawing Figures

WHITE  RED  BLUE  BLACK

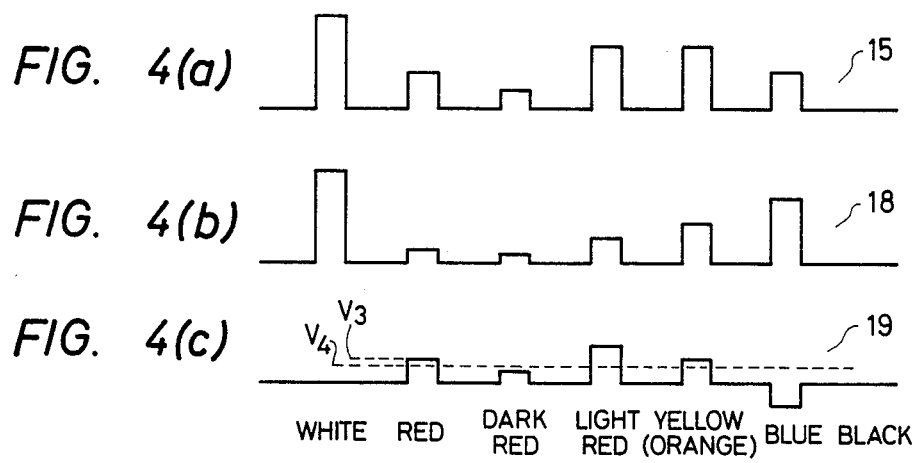
FIG. 4(a)
FIG. 4(b)
FIG. 4(c)
WHITE RED DARK RED LIGHT RED YELLOW (ORANGE) BLUE BLACK
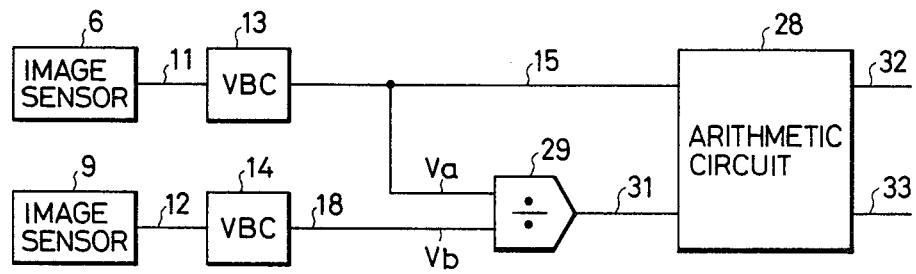
FIG. 5
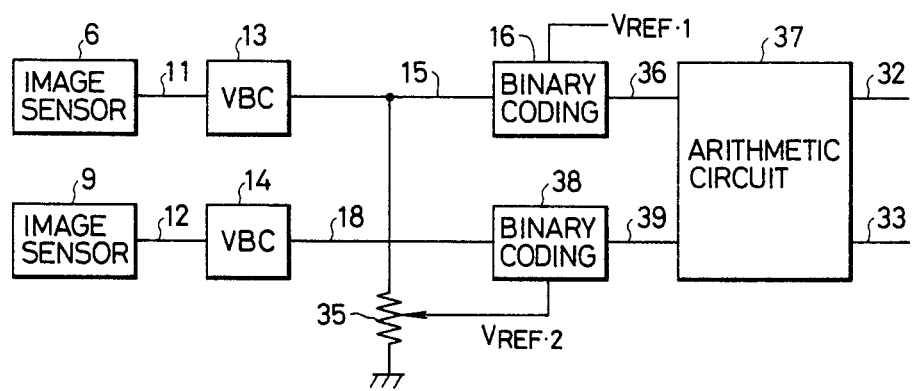
FIG. 6

COLOR PICTURE READING SYSTEM

BACKGROUND OF THE INVENTION

This invention relates to a color picture reading system in which the video data of an original are separated according to predetermined hues, to thereby perform the reading operation.

A color reading device for reading color pictures employs a plurality of reading elements or image sensors, for converting optical images of the same original of different wavelength ranges into electrical signals, which are utilized to form video signals separated according to at least two colors.

FIG. 1 shows the arrangement of an optical system of a color picture reading apparatus which reads two colors, namely, red and black. In this apparatus, an original 1 is illuminated by a pair of fluorescent lamps 2 and 3, and light reflected from the original 1 is applied to a half-mirror 4, where it is split into two light beams. One of the two light beams is that reflected by the half-mirror 4. This light beam is converged by a lens 5, so that the image of the original is formed on a first image sensor 6. The other light beam (that which passes through the half-mirror 4) is applied through a lens 7 to a cyan filter 8, where a red wavelength component is removed from the light beam, and the image of the original is formed on a second image sensor 9.

In the first and second image sensors 6 and 9, the optical images are subjected to photo-electric conversion for every scanning line, as a result of which video signals 11 and 12 are provided as shown in FIG. 2. The video signal 11 on the white light side is supplied to a first automatic background control circuit 13 (hereinafter referred to as a first VBC circuit), while the video signal 12 on the cyan light side is supplied to a second automatic background control circuit 14 (hereinafter referred to as a second VBC circuit). The first and second VBC circuits 13 and 14, each being a kind of AGC circuit, operate to allow the background (white) levels to coincide with each other. The video signal 15, the level of which has been adjusted, is applied to a first binary-coding circuit 16 and the plus (+) terminal of a comparator 17. Similarly, the video signal 18 on the cyan light side, the level of which has been adjusted, is supplied to the minus (−) terminal of the comparator 17. In the comparator, the video signals 15 and 18 thus applied are subjected to subtraction to provide a video signal 19, which is applied to a second binary-coding circuit 21.

With respect to pure white, red, blue and black colors, the video signal 15 on the white light side will be in signal level states as respectively indicated from left to right in FIG. 3(a). Therefore, when the video signal 15 is binary-coded with a threshold level $V_2$ lower than the white level $V_1$ in the first binary-coding circuit, a video signal 22 is obtained in which red, blue and black signals are in the L(low) level state. On the other hand, the red wavelength component is selectively removed from the video signal 18 on the cyan light side by the cyan filter 8 (FIG. 1). Accordingly, with respect to the above-described color data, the video signal 18 has signal level states as indicated in FIG. 3(b). Therefore, in the video signal from the comparator 17, only the red data is represented by a positive level signal as indicated in FIG. 3(c). Hence, when the video signal 19 is binary-coded with a positive signal level $V_4$ slightly lower than the red signal level $V_3$ in the second binary-coding circuit 21, a video signal 23 is obtained in which only red is in the H (high) level state.

The two video signals 22 and 23 thus obtained are supplied to an arithmetic circuit 24 (FIG. 2). In the arithmetic circuit 24, red is separated from the other colors and a final video signal 23 representing the red video data is output as a red video signal 25, or it is output as a red video signal 25 after its logical state is changed. With the video signal 22 representing red, blue and black, the red signal component is removed by way of a logical operation using the video signal 23, so that the video signal 22 is output as a black video signal 26 representing black (including colors other than red). By the utilization of the video signals 25 and 26, the apparatus on the reproduction side reproduces the picture in two colors, namely, red and black.

In the above-described conventional color picture reading system, it is difficult to perform ideal color separation. For instance, in this system in which red and black are separated from one another, blackish red is often read as black, and yellow or orange is read as red. That is, the system is liable to carry out color separation according to a reference which is not satisfactorily in agreement with the human sense of sight, with the result that picture reproduction is unsatisfactory.

The reason for this will be described with reference to FIG. 4. FIG. 4(a) shows the white, red, dark red, light red, yellow (orange), blue and black signal levels of the video signal 15 on the white light side output by the first VBC circuit 13, from left to right therein. FIG. 4(b) indicates the white, red, dark red, light red, yellow (orange), blue and black signal levels of the video signal 18 on the cyan light side as output by the second VBC circuit 14.

As is apparent from a comparison between the video signals 15 and 18, red and yellow (orange) are relatively high in signal level in the video signal 15, and accordingly the difference between the red and yellow (orange) signal levels of the video signal 15 and those of the video signal 18 which has passed through the cyan filter are relatively large. On the other hand, dark red is relatively low in signal level in the video signal 15, and accordingly the difference between the dark red signal level of the video signal 15 and that of the video signal 18 is relatively small. Accordingly, in the video signal 19 as shown in FIG. 4(c), which is the difference between the video signals 15 and 18, light red and yellow (orange) are higher in signal level than dark red. Accordingly, if the video signal 19 is binary-coded with a signal level $V_4$ which is slightly lower than the signal level of pure red, then slightly dark red which is recognized as red rather than black in the sight sense is read as black, while yellow or orange, which is not so recognized as red, is read as red. If the binary-coding threshold level is decreased in order that dark red is read as red, other colors in the warm color range are read as red. This cannot achieve the object of the reading apparatus that red be accurately read out of the video data.

SUMMARY OF THE INVENTION

In view of the foregoing, an object of this invention is to provide a color picture reading system in which color separation is performed in conformance with the human sense of sight.

In a color reading system in which the optical images of an original, which are of different (i.e., wide and narrow) wavelength ranges are converted into electrical signals, which are processed to perform two-color separation; according to the invention, the color separation decision level is set according to a variation factor between the electrical signals, whereby color separation is achieved satisfactorily.

BRIEF DESCRIPTION OF THE DRAWINGS

FIGS. 4(a)–4(c) are waveform diagrams for describing difficulties accompanying the conventional system;

FIG. 5 is a block diagram of a color picture reading apparatus for describing the principle of color reading according to this invention;

FIG. 6 is a block diagram showing the essential components of a color reading apparatus employing a color reading system according to one embodiment of the invention.

DETAILED DESCRIPTION OF THE PREFERRED EMBODIMENTS

Figure 1:
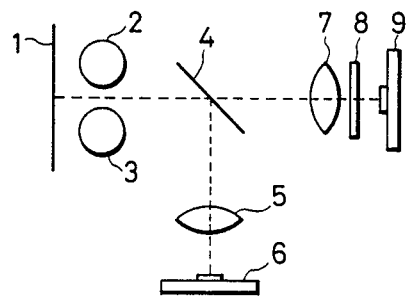
FIG. 1 is an explanatory diagram showing the arrangement of one example of an optical system of a color picture reading apparatus.
Figure 2:
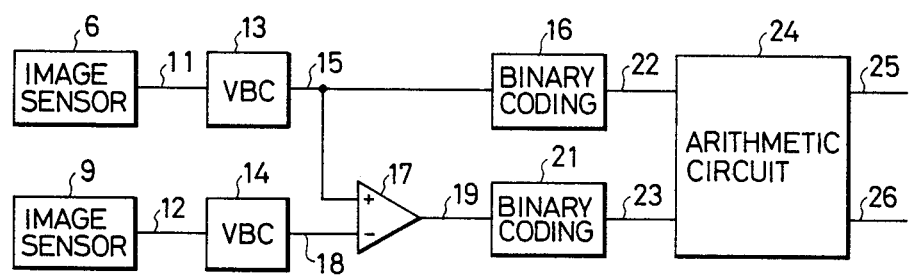
FIG. 2 is a block diagram showing the essential components of the circuitry of a color picture reading apparatus employing a conventional color picture reading system.
Figure 3A:
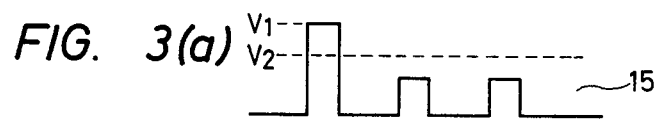
FIGS. 3(a)–3(c) are waveform diagrams for describing the principle of standard color separation according to the above-described system.
Figure 3B:
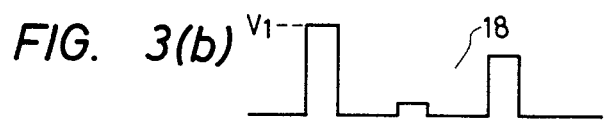
Figure 3C:
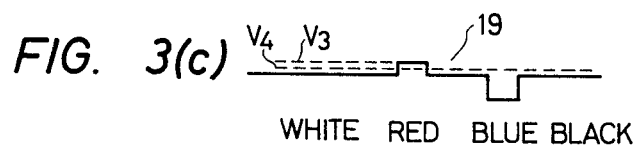

FIG. 5 is a diagram for describing the principle of this invention for reading red and black. Video signals 11 and 12 from first and second image sensors 6 and 9 are supplied to first and second VBC circuits 13 and 14, respectively, which outputs a video signal 15 on the white light side and a video signal 18 on the cyan light side, respectively. The video signal 15 is applied to an arithmetic circuit 28 and a divider 29, while the video signal 18 is supplied to only the divider 29. In the divider 29, the signal level $V_a$ of the video signal 15 and the signal level $V_b$ of the video signal 18 are subjected to division.

The video signals 15 and 18 have been adjusted in level by the VBC circuits 13 and 14, respectively. Accordingly, when $V_a/V_b$ is one (1), the video data read is of a neutral color. When $V_a/V_b$ is smaller than one (1), the video data is of a cyan system; and when $V_a/V_b$ is larger than one (1), the video data read is of a red system which is in complementary relation therewith. The calculation result, after being binary-coded with a predetermined value, is supplied as division data 31 to the arithmetic circuit 28. The arithmetic circuit 28 forms a red video signal 32 and a black video signal 33 by the use of the video signal 15 and the division data 31.

FIG. 6 shows a color picture reading apparatus according to an embodiment of the invention. In this apparatus, a voltage division circuit is employed instead of the divider. The video signal on the white light side is applied to a first binary-coding circuit 16 and to one terminal of a resistor 35, the other terminal of which is grounded. In the first binary-coding circuit 16, the video signal 15 is binary-coded with a predetermined threshold level $V_{REF-1}$.

Figure 7A:
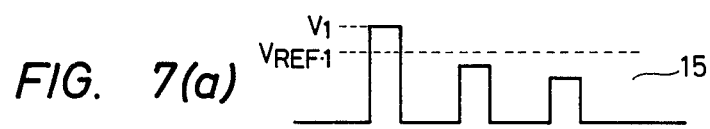
FIGS. 7(a) and 7(b) are waveform diagrams for describing the principle of color separation according to the system.

FIG. 7(a) shows the white, red, blue and black signal levels in the video signal 15 in the stated order from left to right. When the threshold level $V_{REF-1}$ is set slightly lower than the level $V_1$ of white, a video signal 36 is obtained in which red, blue and black are in the L level state. In the case of the video signal 36, of course, dark red, light red and yellow (orange) are also in the L level state. The video signal 36 is supplied to an arithmetic circuit 37.

On the other hand, the video signal 18 on the cyan light side is supplied to a second binary-coding circuit 38. In this circuit, the video signal 18 is binary-coded using the voltage $V_{REF-2}$ as a reference voltage, which value is obtained by dividing the voltage across the resistor 35 by a predetermined ratio. That is, binary-encoding is carried out with a reference voltage $V_{REF-2}$ which is proportional to the signal level of the video signal 15.

Figure 7B:
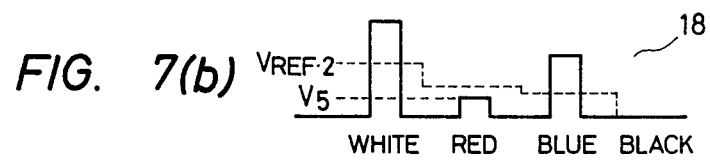

This will become more apparent from FIG. 7(b) in which the solid line indicates the signal levels of various colors in the video signal 18 corresponding to those in FIG. 7(a). The dotted line indicates the threshold level $V_{REF-2}$ for these colors. The threshold level $V_{REF-2}$ is variable. When the reading apparatus reads red video data, the threshold level $V_{REF-2}$ is set so as to be slightly higher than the signal level $V_5$ thereof. In the case of yellow (orange) not shown in FIG. 7, the threshold level $V_{REF-2}$ is set relatively low, and therefore an H level signal is obtained by binary-coding, similarly as in the case of white. That is, the second binary-coding circuit 38 outputs a video signal 39 in which the L level signal state corresponds accurately to red.

The video signals 36 and 39 are supplied to the arithmetic circuit 37. The arithmetic circuit 37 outputs the video signal 39 as a red video signal 32 either as it is or after changing the logical state thereof. Furthermore, the arithmetic circuit 37 operates to output the video signal 36 as a black video signal 33 representing black (including colors other than red) by removing the red signal component through logical operation using the video signal 39. By the utilization of the video signals 32 and 33, the apparatus on the reproduction side can perform the reproduction of pictures in which red is clearly separated from other colors.

According to the invention, for a given original, the color separation decision level is set according to the variation factor between two video signals which are different (narrow and wide) in wavelength range. Therefore, it is unnecessary to prepare originals with an especially specified writing tool, and color pictures can be accurately read.

What is claimed is:

1. A color picture reading system, comprising:
    first and second means for subjecting an optical image of an original to photo-electric conversion with respectively wide and narrow wavelength ranges;
    first encoder means for binary-encoding a signal obtained from said first means with a predetermined voltage level;
    second encoder means for binary-encoding an output signal from said second means with a single threshold level proportional to a level of said signal from said first means; and
    circuit means for processing signals output by said first and second encoder means to perform a desired two-color separation.

2. A reading system as claimed in claim 1, said first and second means comprising first and second photo-electric converters.

3. A reading system as claimed in claim 1, said narrow wavelength range comprising said wide wavelength range with a specific color range having been removed.

4. A reading system as claimed in claim 1, further comprising voltage division means arranged between an output of said first photo-electric conversion means and an input of said second encoder means.

5. A reading system as claimed in claim 4, said voltage divider means comprising resistor means.

6. A reading system as claimed in claim 3, said circuit means including means for outputting a signal representative of said specific color range, and means for removing said specific color range from the output of said first encoder means.

* * * * *